(12) United States Patent
Knusel

(10) Patent No.: US 7,654,197 B2
(45) Date of Patent: Feb. 2, 2010

(54) HAND PRESS FOR FOOD

(76) Inventor: Othmar Knusel, Elsisstrasse 5, Uhwiesen (CH) 8248

( * ) Notice: Subject to any disclaimer, the term of this patent is extended or adjusted under 35 U.S.C. 154(b) by 437 days.

(21) Appl. No.: 10/592,300

(22) PCT Filed: Mar. 14, 2005

(86) PCT No.: PCT/CH2005/000152

§ 371 (c)(1),
(2), (4) Date: Sep. 11, 2006

(87) PCT Pub. No.: WO2005/087063

PCT Pub. Date: Sep. 22, 2005

(65) Prior Publication Data
US 2007/0175342 A1 Aug. 2, 2007

(30) Foreign Application Priority Data
Mar. 16, 2004 (CH) .................... 0443/04

(51) Int. Cl.
B30B 9/06 (2006.01)
(52) U.S. Cl. ............... 100/110; 100/234; 100/243; 99/495; D7/666
(58) Field of Classification Search .......... 100/110, 100/112, 116, 125, 234, 243, 902; 99/495, 99/500–508; 241/95, 167, 169.1, 169.2; D7/666, 686; 30/120.2, 120.5
See application file for complete search history.

(56) References Cited

U.S. PATENT DOCUMENTS

| 879,870 | A | * | 2/1908 | Hansen | 100/228 |
| 1,401,800 | A | * | 12/1921 | Ellsworth | 53/300 |
| 4,545,299 | A | * | 10/1985 | Ahner | 100/112 |
| 6,112,650 | A | * | 9/2000 | Mazzaccaro | 100/110 |
| 2002/0092430 | A1 | * | 7/2002 | Dempsey | 100/234 |

FOREIGN PATENT DOCUMENTS

DE 20116151 U1 * 5/2002

* cited by examiner

Primary Examiner—Jimmy T Nguyen
(74) Attorney, Agent, or Firm—John R. Benefiel

(57) ABSTRACT

A hand press (1) for squeezing garlic cloves having a double lever linkage driving a ram 30 into a receiving container (2). Two handles (4,5) pivoted together at one end to operate as levers operate two crossing lever arms (6,7) which are pivoted to each other. Pressing with minimal effort takes place due to the mechanical advantage which is produced by the double lever linkage. Additional advantages of the device are that it can be manufactured with minimal edge clearance between the ram (3) linkage and the receiving container (2), a stop (71) for automatically positioning the ram (3), a return spring (8) for automatically opening the hand press (1), and an anti-adhesive coating of the discharge pins (33) on the ram (30) and the base (20) of the receiving container (2).

9 Claims, 4 Drawing Sheets

HAND PRESS FOR FOOD

TECHNICAL FIELD

The present invention relates to a hand press for a material intended for pressing foodstuff.

PRIOR ART/BACKGROUND ART

Hand presses of the aforementioned kind are used in households in many different ways, in particular as garlic presses. Commercially available garlic presses exhibit a simple lever transmission. A first handle is attached for this purpose to a press cylinder for the garlic, of which the bottom is perforated with a large number of openings. A second handle is attached to a press piston, which is guided in the press cylinder. In addition, the handles are attached to one another in a pivoting fashion, so that a lever action occurs between the handles on the one hand and the press cylinder and the press piston on the other. Garlic presses of this kind are previously disclosed, for example, in US-A 2002/069769, EP-A 1 106 125, U.S. Pat. No. 5,791,237 or U.S. Pat. No. 5,513,562.

The lever action of such a garlic press is frequently not adequate, however, with the result that high pressure forces must be applied to the handles in order to press out the garlic. This leads rapidly to fatigue.

It has accordingly been proposed in DE-U 201 16 151 to attach a first handle to the press cylinder in a pivoting fashion, to attach a second handle to the first handle in a movable fashion via a guide link, and to articulate both the press cylinder and a press piston in a pivoting fashion on the second handle. The transmission of force from the handles onto the press cylinder and the press piston is, in fact, improved by this "articulated lever mechanism". However, the press piston and the press cylinder describe a strong angular movement in conjunction with the filling and pressing sequence, which makes handling difficult and, in particular, requires the exact alignment of the press piston to enable it to be introduced into the press cylinder.

DESCRIPTION OF THE INVENTION

An object of the present invention is to make available a hand press, which permits pressing out of a material intended for pressing with a low expenditure of force and offers convenient handling.

The hand press is accordingly equipped with a double lever transmission, in conjunction with which this double lever transmission is provided by the arrangement of handles, lever arms, receiving container and ram. The double lever transmission results in a favorable transfer, that is to say a favorable ratio, between the force that acts on the material intended for pressing and the force that must be applied to the handles, and with effective and simple ease of handling at the same time. In view of its outstanding characteristics, this press is also designated as "5-star".

Advantageous embodiments of the hand press in accordance with the invention are indicated in the dependent patent claims.

BRIEF DESCRIPTION OF THE FIGURES

The invention is described below in greater detail with reference to the drawings, in which.

DETAILED DESCRIPTION OF THE INVENTION

Figure 1:
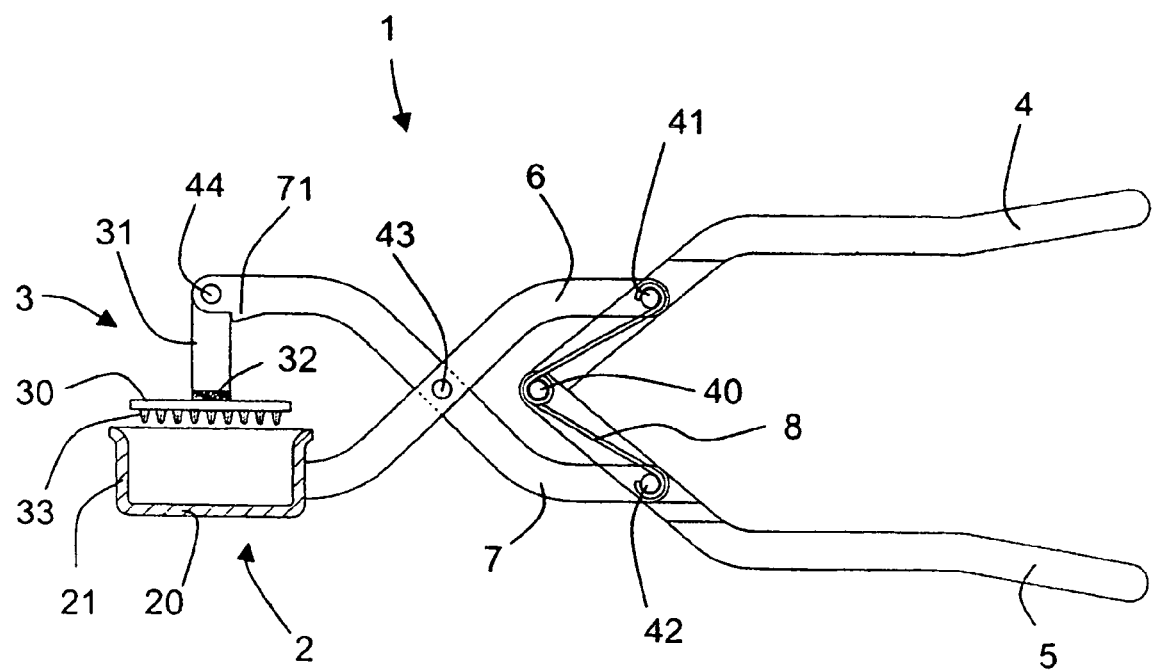
FIG. 1 shows a schematic side view of a garlic press in accordance with a first embodiment, partially in cross section.

A garlic press 1 is shown in FIG. 1 as an example of a hand press in accordance with the invention. The garlic press exhibits a receiving container in the form of a press cylinder 2, which serves the purpose of receiving the material intended for pressing, in this case garlic. A plunger-like ram 3 serves the purpose of pressing the garlic through openings, not illustrated in FIG. 1, in the bottom 20 of the press cylinder 2. The term ram is used here to denote an object with any desired form that is adapted to interact with a receiving container for the material intended for pressing in such a way that a pressure is exerted on the material intended for pressing.

In addition, the garlic press represented in FIG. 1 comprises two handles 4, 5. These are attached to one another in a pivoting fashion via a pivot 40 close to their respective ends.

A first lever arm 6 is rigidly attached at its one end to the press cylinder 2. Close to its other end, the first lever arm 6 is pivotally attached to the first handle 4 via a pivot 41. A second lever arm 7 is pivotally attached close to its one end to the ram 3 via a pivot 44. Close to its other end, the second lever arm 7 is pivotally attached to the second handle 5 via a pivot 42. The lever arms in this case are guided in a "cross-over" fashion and are pivotally attached to one another at their cross-over point via a pivot 43.

The arrangement of the press cylinder 2, ram 3, handles 4, 5 and lever arms 6, 7 in this way results in the following mode of operation of the garlic press: pressing the handles 4, 5 together gives rise to forces which generate turning moments about the pivot 40. These turning moments lead to correspondingly increased forces at the locations of the pivots 41 and 42, in conjunction with which the levels of these forces are determined in relation to the pivot 40 by the principle of the lever. These forces in turn generate turning moments about the pivot 43 via the lever arms 6, 7. Forces are applied in this way to the press cylinder 2 and the ram 3, which are now determined in relation to the pivot 43 by the principle of the lever. In FIG. 1, the sections of the lever arms 6, 7 respectively to the left and right of the pivot 43 are of more or less identical length, that is to say the forces that arise at the locations of the pivots 41 and 42 are transmitted at more or less identical levels to the location of the material intended for pressing. The forces generated by the single lever of the handles 4, 5 at the locations of the pivots 41, 42, at which neither the press cylinder nor the ram could be applied because of the restricted conditions of space, are thus transmitted to a location at which sufficient space is available through the double lever transmission.

In the event that the lever effect requires to be further improved, both the force transmission ratio of the handles 4, 5 to the pivots 41, 42 and the force transmission ratio of the pivots 41, 42 to the material intended for pressing can be varied. The positions of the pivots 41 and 42 can thus be selected closer to the pivot 40, which improves the transmission of force from the handles 4, 5 to the pivots 41, 42, or the geometry of the lever arms 6, 7 can be varied in order to improve the transmission of force there. In practice, however, the maximum useful force transmission is limited by the fact that the ram must still execute an adequate lift, for example from 1.5 to 3 cm, when the ends of the handles are pressed together by a practically usable amount, for example by about 3 to 8 cm. The garlic press is accordingly preferably executed in such a way that the force transmission ratio from the ends of the handles 4, 5 to the material intended for pressing lies between approximately 1.5 and 6, and preferably between 2 and 5.

The force transmission ratio of the lever arms 6, 7 alone, that is to say the ratio between the distance from the pivot 43 to the pivot 41 and 42 on the one hand, and from the pivot 43 to the center of the press cylinder and to the pivot 44 on the other hand, is in the order of 1.0 in FIG. 1. This ratio preferably lies between 0.5 and 2, and more preferably still between 0.8 and 1.5. Values smaller than 1 may be sensible, since such values result in a greater gain of space; the more unfavorable transmission of force for such values may be compensated, for example, by a higher transmission of force at the lever system of the handles. Values greater than 1 lead to a further amplification of the lever effect.

An overall transmission ratio for the forces applied to the material intended for pressing can be achieved in this way, which could not be achieved with a single lever system because of the associated space problems.

Attached to the pivots 40, 41 and 42 is a return spring 8, which forces the handles 4, 5 apart. This brings about automatic opening of the garlic press 1 as soon as no further pressure is applied to the handles. This spring 8 is represented in FIG. 1 as a piece of spring elastic wire, which is wound around the pivot 40 for a number of turns, and the ends of which are secured to the pivots 41 and 42.

In a preferred embodiment, the handles 4, 5 exhibit at least partially a hollow profile that is open internally, for example a U-shaped profile. This permits the concealed installation of the return spring 8 in the inside of the profile.

A stop means in the form of a nose 71 on the lever arm 7 prevents the ram 3 from being capable of pivoting outwards beyond a specific orientation in the direction of the handles (to the right in FIG. 1). The nose 71 is applied in such a way that, in the orientation in which the ram 3 comes into contact with the nose 71 (in which the stop means is effective in general terms), the ram 3 can be introduced into the press cylinder without further manual positioning or adjustment. Inconvenient, time-consuming manual positioning is avoided in this way. Instead of being executed on the lever arm 7, the stop means can also be executed on the ram 3 and/or can exhibit a form other than that of the nose 71, provided that the function of restricting the range of pivoting of the ram is still afforded.

Figure 2:
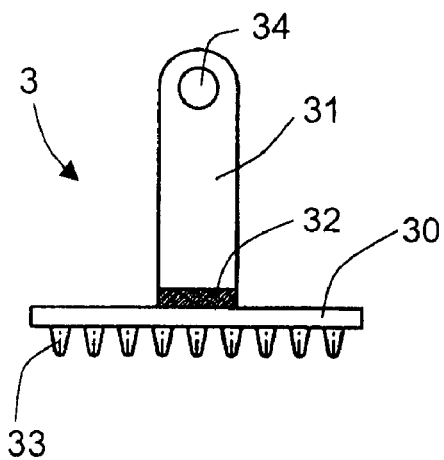
FIG. 2 shows an enlarged side view of the ram of the garlic press in FIG. 1.
Figure 3:
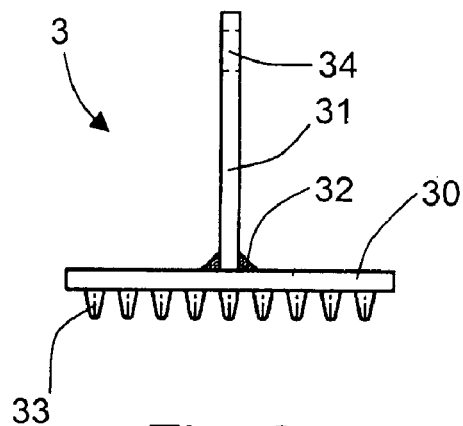
FIG. 3 shows a side view of the ram in FIG. 2 rotated through 90°.

FIGS. 2 and 3 illustrate views of the ram observed from two directions. The plunger-shaped ram consists of a circular, flat base plate 30 and a holder 31 in the form of an elongated plate. Present at the point of connection between the base plate 30 and the holder 31 is a reinforcement 32, which is intended to prevent the holder from parting from the base plate. A plurality of ejection points 33 is present on the base plate. These exhibit an essentially conical form that extends downwards and is rounded at the bottom end. Present in the vicinity of the upper end of the holder 31 is a drilled hole 34 for connecting the ram to the lever arm 7.

Figure 4:
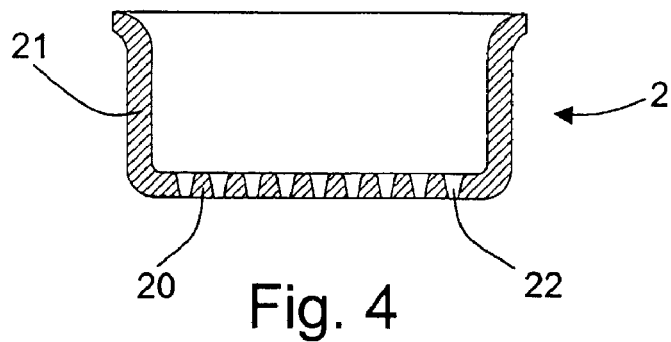
FIG. 4 shows a cross section through the press cylinder of the garlic press in FIG. 1.

FIG. 4 illustrates a cross section through the press cylinder, in conjunction with which, unlike in the case of FIG. 1, the openings 22 in the bottom 20 are represented explicitly. These openings 22 correspond to the ejection points 33 in their arrangement, form and dimensions, so that these engage with a perfect fit in the openings 22 when the ram 3 is introduced completely into the press cylinder 2. The most complete forcing out possible of the material intended for pressing through the openings 22 is achieved in this way, without any residue remaining in these openings. The side wall 21 of the press cylinder is curved slightly outwards on its upper edge, so that the press cylinder broadens out slightly or its upper edge in order to permit easy introduction of the ram 3.

Figure 5:
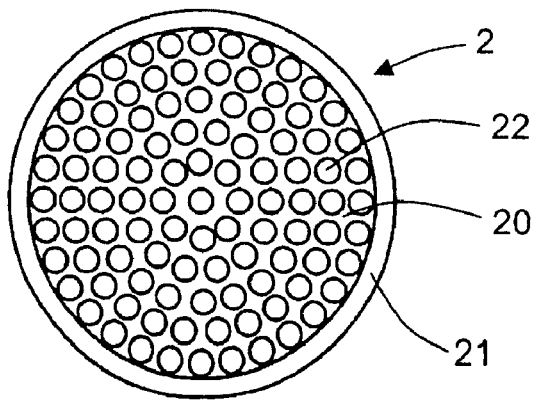
FIG. 5 shows a view from above of the press cylinder in FIG. 4.
Figure 6:
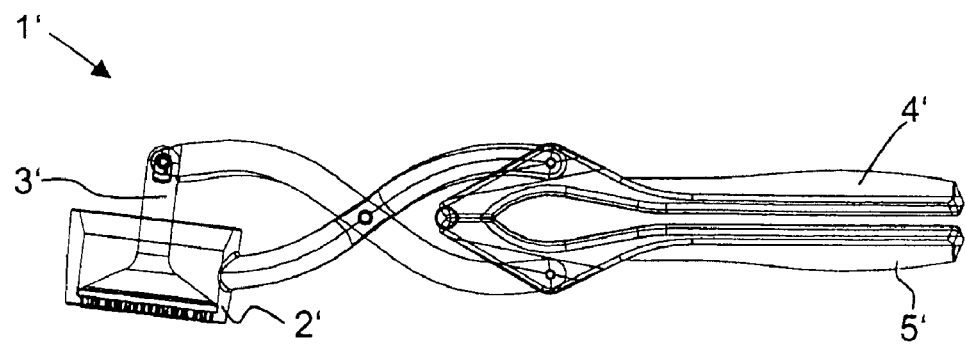
FIG. 6 shows a ghosted view ("x-ray image") of a garlic press in accordance with a second embodiment.
Figure 7:
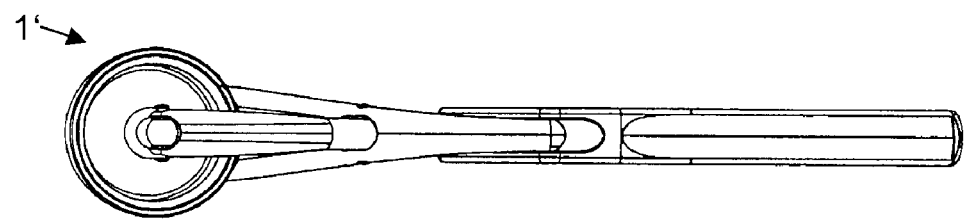
FIG. 7 shows a view from above of the garlic press in FIG. 6.
Figure 8:
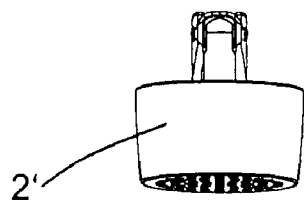
FIG. 8 shows a view from the front of the garlic press in FIG. 6.
Figure 9:
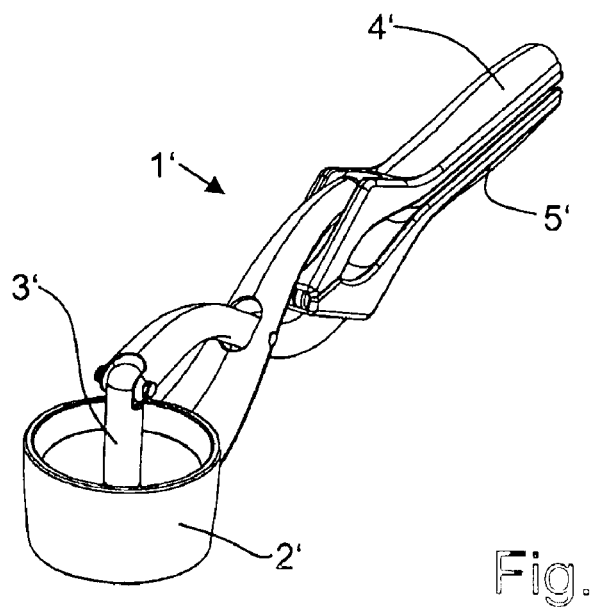
FIG. 9 shows a perspective view of the garlic press in FIG. 6.
Figure 10:
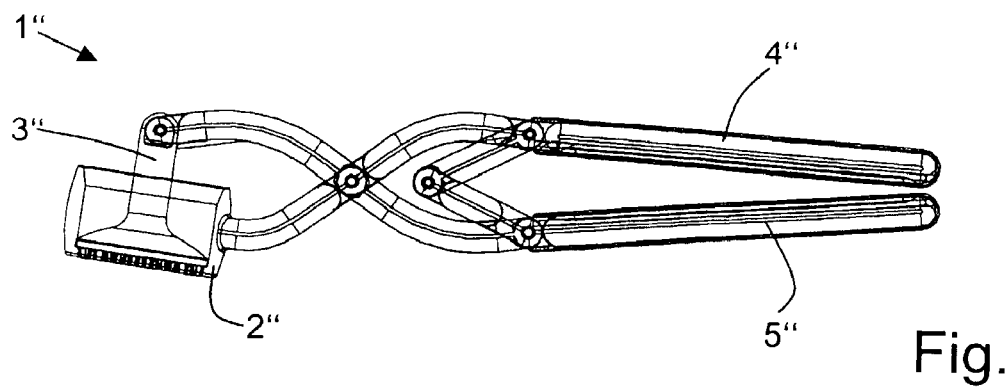
FIG. 10 shows a ghosted view ("x-ray image") from the side of a garlic press in accordance with a third embodiment.
Figure 11:
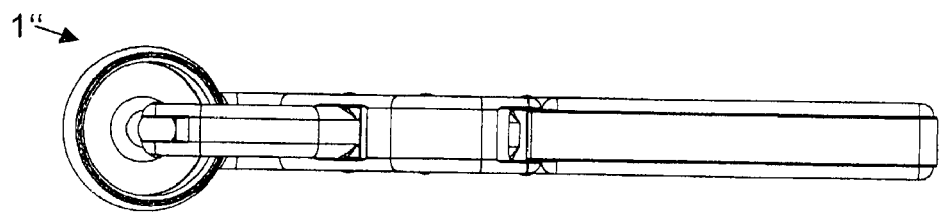
FIG. 11 shows a view from above of the garlic press in FIG. 10.
Figure 12:
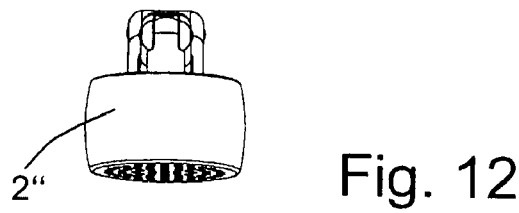
FIG. 12 shows a view from the front of the garlic press in FIG. 10.
Figure 13:
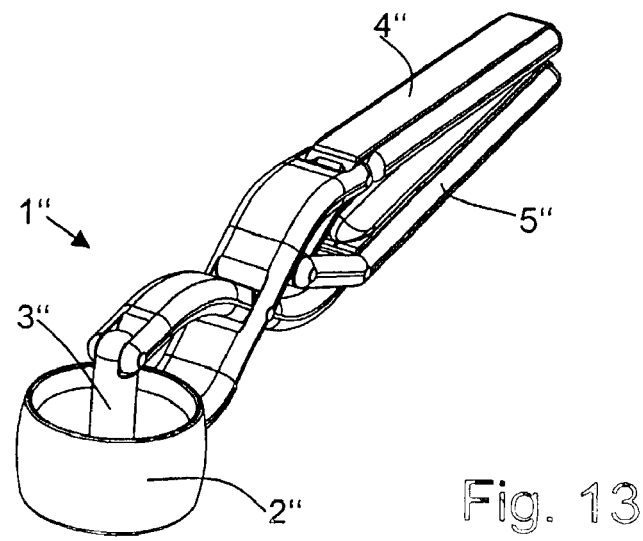
FIG. 13 shows a perspective view of the garlic press in FIG. 10.

FIG. 5 illustrates the press cylinder 2 in a view from above. An advantageous arrangement of the openings 22 can be appreciated in the bottom 20, according to which the openings 22 are arranged in a sequence of concentric rings in each case with identical distances between the openings 22 within each ring. Such an arrangement minimizes disadvantageous dead areas at the outer edge of the bottom 20 of the press cylinder 2.

Of importance for the effective function of the garlic press is the smallest possible edge clearance, that is to say the smallest possible distance between the periphery of the ram 3 and the interior of the side wall 21 of the press cylinder 2 when the ram 3 is introduced and centralized in the press cylinder 2. This distance defines an annular space between the ram 3 and the interior of the side wall 21. When the edge clearance is too great, material intended for pressing can be forced upwards through the annular space, instead of through the openings 22 in the bottom 20. The distance which defines the edge clearance should preferably be less than about 1 millimeter, more preferably less than 0.5 millimeter, and better still less than 0.3 millimeter.

The garlic press 1 can be produced from plastic or metal, for example, and in particular aluminum. In the event of its manufacture from a metal, this can be coated with plastic, at least in part. The hand press as a whole can be completely covered with a non-stick coating to facilitate clearing. However, at least the parts of the garlic press which come into contact with the material intended for pressing, and at least the ejection points 33 and the bottom 20, can be provided advantageously with such a non-stick coating, for example made from a polytetrafluor ethylene (PTFE), which is familiar under the trade name of Teflon®. Alternatively the ram, for example, can be produced in its entirety from a material with non-stick characteristics.

A music chip of a previously disclosed kind, which plays a melody or generates a noise as the handles are pressed together, can be installed in one of the handles 4, 5. A compartment for a battery, for example a hearing aid battery or a small torch battery, can be provided in one of the handles for this purpose. The electrical wires are routed advantageously via cavities in the handles. An electrical switch, which closes a circuit as the handles are pressed together in order to activate the music chip, can be installed advantageously inside one such cavity. Switching can also be effected in some other way, for example by means of a reed contact installed in one handle and a small permanent magnet installed in the opposite handle. The music chip, the switch and the power supply are advantageously installed in such a way that they are protected against washing-up detergent.

The hand press in accordance with the invention can be modified in a variety of ways without departing from the area of the invention.

The hand press can thus be executed not only as a garlic press, but also as a press for other types of foodstuff, in particular other varieties of vegetable, olives, pasta dough and the like, which will specifically require different dimensions in each case.

A large diversity of forms is possible for the arrangement of the handles, the lever arms, the receiving container and the ram. Aspects of ergonomics, such as the aesthetics of the forms, can have an influence here. In particular, forms other than cylindrical forms are possible for the receiving container, for example with an oval, square or rectangular bottom. This may give rise, as appropriate, to arrangements of the ejection points and openings in the bottom of the receiving container other than those represented in FIG. 5. The ram can exhibit a different form from that of a plunger, for example the form of a solid or hollow piston with ejection points arranged thereon. The cross section of this piston in this case corresponds to the form of the bottom of the receiving container.

The ejection points of the ram need not exhibit the rounded, conical form represented in FIGS. 2 and 3. In a simplified embodiment, for example, the points can also exhibit cylindrical form, in which case a corresponding, matching counter-form of the openings 22 is selected in the bottom 20. The ejection points are advantageously executed at their lower end in a tapering fashion, however, and the openings in the bottom of the receiving container are advantageously broadened out slightly, at least at their upper end, so that the ejection points "locate" easily in their respective openings on actuation of the hand press.

The return spring can be executed in any preferred, previously disclosed form other than that represented in FIG. 1, for example as a flat strip spring. It need not be attached to the pivot 40. The spring must not necessarily interact with the handles 4, 5, but may interact instead with the lever arms 6, 7, for example, provided that its function of opening the hand press is assured, that is to say forcing the plunger 3 and the receiving container 2 away from one another.

Instead of the pivot 40, another type of articulation can be provided for the attachment of the handles, for example a moving, transcurrent plastic connector with a fine articulation seam. Correspondingly, the other moving connections can also be executed between the handles, lever arms and ram in a manner other than that described.

To prevent the fingers from becoming trapped, lateral covers can be applied to the handles 4, 5 and/or to the lever arms 6, 7, which covers extend in parallel with the direction of movement of these elements and at least partially overlap them. Trapping of the fingers can be prevented in this way, in particular in the areas close to the pivots 40 and 43.

FIGS. 6 to 9 illustrate a second embodiment of a garlic press 1' in accordance with the invention with a press cylinder 2' and a ram 3' in different views. This embodiment combines an aesthetically pleasing design with ergonomically favorable characteristics. The hands are prevented from slipping off by the raised, forward areas of the handles 4', 5', whereas the rounded form of the handles permits comfortable operation.

The third embodiment of a garlic press 1" in accordance with the invention with a press cylinder 2" and a ram 3" represented in FIGS. 10 to 13 is also easily operated thanks to the broad handles 4", 5", in this case in a flat execution, and the large area of its design makes it easy to clean and aesthetically appealing.

The invention claimed is:

1. A hand press (1) for a material intended for pressing in the form of a foodstuff the hand press comprising:
   a ram;
   a receiving container for receiving the ram and the material;
   a first handle having a first end and a second opposing end;
   a second handle having a first end and a second opposing end;
   a first lever arm having a first end and a second opposing end; and
   a second lever arm having a first end and second opposing end,
   wherein the second end of the first handle and the second end of the second handle are pivotally attached to one another at a first pivot, the second end of the first lever arm is attached to the receiving container, the first end of the first lever arm is pivotally attached to the first handle at a point intermediate the length of the first handle to form a second pivot, the second end of the second lever arm is attached to the ram, and the first end of the second lever arm is pivotally attached to the second handle at a point intermediate the length of the second handle to form a third pivot, and wherein the first and second lever arms cross each other at a point intermediate their length and the first and second lever arms are pivotally attached to one another at the intermediate point where the lever arms cross each other.

2. The hand press (1) as claimed in claim 1, characterized in that the first lever arm (6) is rigidly attached to the receiving container (2), and the second lever arm (7) is pivotally attached to the ram (3).

3. The hand press (1) as claimed in claim 2, characterized in that present on the second lever arm (7) and/or on the ram (3) is a stop (71), which restricts any pivoting movement of the ram (3) relative to the second lever arm (7), at least in one direction, to such an extent that the ram (3) can be introduced into the receiving container (2) in a position in which the stop (71) is effective and without the need for further positioning.

4. The hand press (1) as claimed in one of claims 1 to 3, characterized in that the receiving container (2) exhibits a bottom (20) with openings (22), and in that the ram (3) exhibits ejection points (33) which are adapted to engage in the openings (22) in the receiving container (2).

5. The hand press (1) as claimed in claim 1, characterized in that the receiving container (2) includes a side wall (21), and in that there is present between the ram (3) and the side wall (21) of the receiving container (2) an edge clearance that is less than or equal to 0.5 millimeter.

6. The hand press (1), as claimed in claim 1, characterized in that the receiving container (2) and the ram (3) are provided at least partially with a non-stick coating.

7. The hand press (1) as claimed in claim 1, characterized in that the hand press (1) in addition includes a return spring (8), the effect of which is to force the ram (3) and the receiving container (2) apart.

8. The hand press (1) as claimed in claim 1, characterized in that it includes a music chip so adapted, in conjunction with an actuation of the hand press (1), as to play a melody or to generate a noise.

9. The hand press (1) as claimed in claim 1, characterized in that the hand press container includes a bottom wall formed with a pattern of openings and said ram includes a plate having points fitting into said openings when said ram is advanced into said container.

* * * * *